(12) United States Patent
Lehmann

(10) Patent No.: US 7,108,314 B2
(45) Date of Patent: Sep. 19, 2006

(54) SLIDINGLY RETRACTABLE PICKUP TRUCK WIND DEFLECTION SYSTEM AND METHOD

(75) Inventor: Harry V. Lehmann, P.O. Box 1846, Novato, CA (US) 94948

(73) Assignee: Harry V. Lehmann, Novato, CA (US)

( * ) Notice: Subject to any disclaimer, the term of this patent is extended or adjusted under 35 U.S.C. 154(b) by 74 days.

(21) Appl. No.: 11/036,325

(22) Filed: Jan. 18, 2005

(65) Prior Publication Data

US 2006/0043769 A1 Mar. 2, 2006

Related U.S. Application Data

(60) Provisional application No. 60/604,693, filed on Aug. 27, 2004.

(51) Int. Cl.
*B60J 1/00* (2006.01)

(52) U.S. Cl. .................................................. 296/180.1

(58) Field of Classification Search ............. 296/180.1, 296/57.1, 50, 180.5
See application file for complete search history.

(56) References Cited

U.S. PATENT DOCUMENTS

| | | | |
|---|---|---|---|
| 2,603,529 A | 7/1952 | Troth et al. | |
| 4,159,843 A | 7/1979 | Crossman | |
| 4,451,075 A | 5/1984 | Canfield | |
| 4,506,870 A * | 3/1985 | Penn ........................ | 296/180.1 |
| 4,585,263 A * | 4/1986 | Hesner ..................... | 296/180.1 |
| 4,884,838 A * | 12/1989 | Slater ....................... | 296/180.1 |
| 5,069,498 A * | 12/1991 | Benchoff ................. | 296/180.1 |
| 5,076,636 A | 12/1991 | Buck et al. | |
| 5,083,829 A | 1/1992 | Fonseca | |
| 5,147,103 A | 9/1992 | Ducote | |
| 5,154,470 A | 10/1992 | Bringman, Jr. | |
| 5,232,259 A | 8/1993 | Booker | |
| 5,271,656 A | 12/1993 | Hull et al. | |
| D351,819 S * | 10/1994 | Baddeley ................... | D12/181 |
| D360,395 S | 7/1995 | Almen | |
| 5,435,616 A * | 7/1995 | Corner ..................... | 296/180.1 |
| 5,498,049 A | 3/1996 | Schlachter | |
| 5,498,058 A * | 3/1996 | Kuo ......................... | 296/180.1 |
| 5,551,747 A * | 9/1996 | Larsen ..................... | 296/180.1 |
| 5,722,714 A | 3/1998 | Vallerand | |
| 5,735,567 A | 4/1998 | Mora, Sr. | |
| 5,743,589 A * | 4/1998 | Felker ...................... | 296/180.1 |
| D410,427 S * | 6/1999 | Kokones .................... | D12/400 |
| 6,059,350 A | 5/2000 | Kooiker | |
| 6,206,444 B1 | 3/2001 | Casey | |
| 6,325,448 B1 | 12/2001 | Estrada et al. | |
| 6,517,140 B1 * | 2/2003 | Wilde ....................... | 296/180.1 |
| 6,550,836 B1 | 4/2003 | Rigau | |
| 6,712,423 B1 * | 3/2004 | Lehmann ................. | 296/180.1 |
| 6,729,680 B1 | 5/2004 | Lehmann | |
| 2002/0163222 A1 * | 11/2002 | Lehmann ................. | 296/180.1 |

\* cited by examiner

Primary Examiner—Kiran B. Patel
(74) Attorney, Agent, or Firm—Duane Morris, LLP

(57) ABSTRACT

A system and method for deflecting the wind which would otherwise impinge upon the closed tailgate of a pickup truck, the deflector being mounted on the tailgate to preserve cargo space, including a spoiler and including a pair of relatively slidable rigid panels for deflecting the wind. The lower, forward panel overlies the upper rear panel and the relative position of the two panels is controlled by a scissors jack. The position of the distal end of the lower, forward panel is maintained adjacent the truck bed by a gust strap.

8 Claims, 6 Drawing Sheets

SLIDINGLY RETRACTABLE PICKUP TRUCK WIND DEFLECTION SYSTEM AND METHOD

RELATED APPLICATIONS

This application is related to and claims the priority of U.S. Provisional Patent Application Ser. No. 60/604,693 entitled "Sliding Tail Gate Sail" filed Aug. 27, 2004, the disclosure of which is incorporated herein by reference.

BACKGROUND OF THE INVENTION

The present invention relates to a system and method for deflecting the relative wind created by the forward movement of a pickup truck which would otherwise impinge upon the tailgate of the pickup truck.

The adverse effects of wind on the forward facing surface of the tailgate of a pickup truck are well known. Many have addressed the problem by providing a rearwardly and upwardly inclined surface deflecting the wind up and over the tailgate when the truck bed is not filled with cargo. Often, such deflectors are in combination with the definition of storage areas (see, e.g. the Canfield U.S. Pat. No. 4,451,075 and the Kuo U.S. Pat. No. 5,498,058), loading ramps (see, e.g. the Slater U.S. Pat. No. 4,884,838), etc. and thus require substantial modification of the truck bed and/or tailgate. Many of the single function devices also require modification of the truck bed and/or the tailgate of the pickup truck to store the deflector when not deployed (see, e.g. the Corner U.S. Pat. No. 5,435,616).

Others such as that disclosed in the Larsen U.S. Pat. No. 5,551,747 address the stowage problem by providing a false floor which is hinged to the bed at the front end thereof so that the rear end thereof may be selectively raised and lowered. In addition to the requirement that the bed of the truck be modified, the presence of the deflector on the bed is problematical and an unsatisfactory gap is created between the raised end of the deflector and the tailgate.

More recently, Lehmann U.S. Pat. No. 6,712,423 dated Mar. 30, 2004 discloses and claims a flexible sail retractably mounted on the top of the tailgate.

Still other attempts to address the stowage problem include the hinging of two rigid panels to the top of the tailgate and the folding thereof into a stored position against the forward facing surface of the closed tailgate. The maintenance of the sail in the deployed position, and the mechanism for attaching the two rigid panels to each other, remain problematic.

For example, the Vallerand U.S. Pat. No. 5,722,714 maintains the panels in the deployed position by fastening the distal end of the forward panel of the wind deflector to the truck bed. This requires modification of the truck bed and increases the difficulty in deploying and storing the deflector. Depressions in the truck bed accumulate dirt and debris which must be removed before the deflector can be stored. The storage of such devices may also interfere with the stowage of a spare tire.

Other systems such as disclosed in the Felker U.S. Pat. No. 5,743,589 avoid the necessity for attaching the distal end of the forward panel of the wind deflector to the truck bed by making the panels sufficiently rigid and thick, and by the location of the hinges used to connect the panels that the abutting edges of the panels limit the rotation of the forward panel upwardly beyond the plane of the rear panel. The force of the relative wind is concentrated on the hinged junction, and, in general, such structures have proven unsatisfactory because of the thickness and strength of materials required to mechanically resist the force of the relative wind. Such structures do not address the gusting problem, apparently depending on the weight of the deflector to maintain the distal end of the lower panel in contact with the truck bed and thus add unwanted weight to the truck.

Attempts to telescope one panel of the wind deflector within the other panel of the deflector for storage against the closed tailgate when not deployed are disclosed in the Benchoff U.S. Pat. No. 5,069,498 and the Mora, Sr. U.S. Pat. No. 5,735,567. These telescoping devices necessarily have substantial thickness inasmuch as the telescoped panel must have sufficient structural integrity to resist the substantial pressure of the relative wind generated by high speed driving, and the telescoping panel must overlie and structurally support the telescoped panel on both top and bottom flat surfaces. Where, as claimed in the Benchoff patent, the forward, lower panel is received into the upper, rear panel, the cavity in the upper panel may capture air flowing up the lower panel and reduce the effectiveness of the deflector. Still additional thickness is required if the assembly includes laterally extendable panels to accommodate truck beds of different widths, and the construction of such complicated assemblies is generally expensive.

More recently, the Lehmann U.S. Pat. No. 6,729,680 issued Mar. 30, 2004 discloses and claims a two piece wind deflector that is pivotally secured to the top of the closed tailgate and folds into a stored position against the forward facing surface of the tailgate. This device utilizes a gust strap connecting the distal end of the forward panel to retain the deflector in the deployed position and thus avoids the problems associated with attachment of the sail to the truck bed. It also addresses the problems associated with the force of the wind on the interconnection of the two panels by the use of a flat brace overlying the junction and by the tensioning of the gust strap so as to create and maintain a compensatory "bow" against the concavity of shape which would otherwise result from the pressure of the relative wind. This latter system has proven to be both light weight and highly effective, and it relies on the gust strap to retain the distal end of the forward panel in the forward and down position when deployed.

The wind deflector of the present invention, in various embodiments, retains the highly desirable characteristic of removable mounting to the tailgate, the avoidance of attachment to the truck bed, and flat storage against the tailgate when not deployed to maximize the cargo carrying capacity of the truck.

In one aspect the wind deflector of the present invention achieves greater structural integrity, strength and rigidity of the sail by connecting the two panels to each other in a sliding relationship with the lower, forward panel overlying the upper, rear panel. In another aspect the deflector of the present invention effects positive control of the distal end of the forward panel both as to the degree of extension and its proximity to the truck bed. In yet another aspect, the deflector of the present invention can be deployed from the fully "stowed" position on the forward facing surface of the closed tailgate to the fully "deployed" position through the actuation of a switch located at one or more convenient places on the vehicle, including the passenger compartment.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
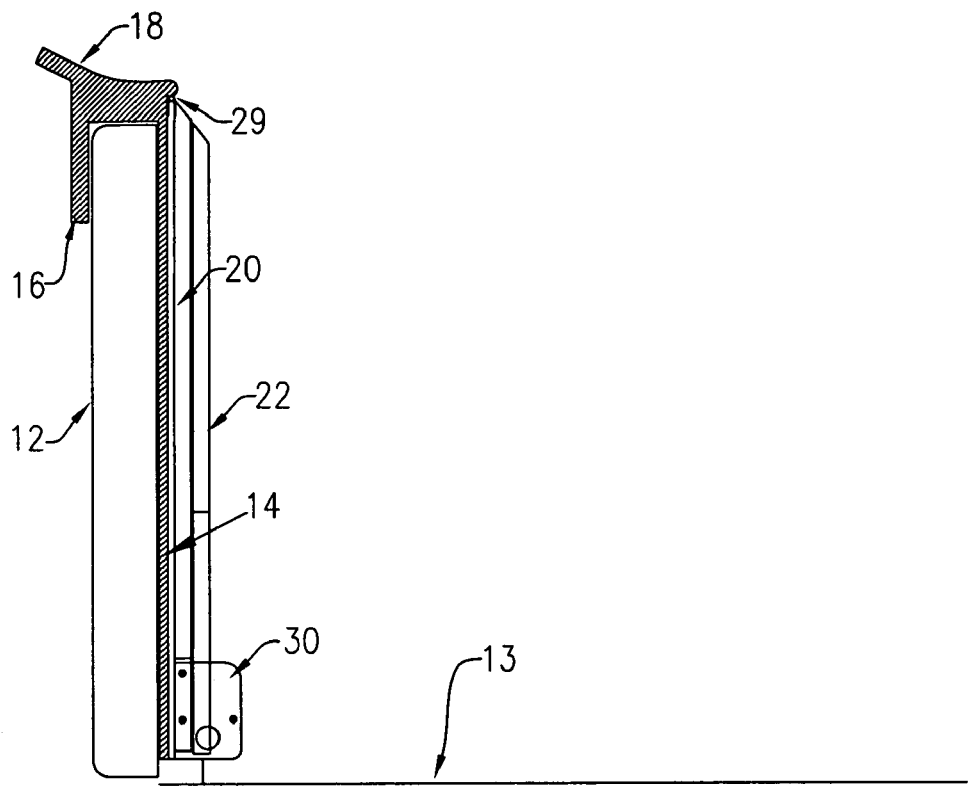
FIG. 1 is a side view of one embodiment of the deflector of the present invention illustrating the mounting thereof on the closed tailgate of a pick up truck in the stowed position.
Figure 2:
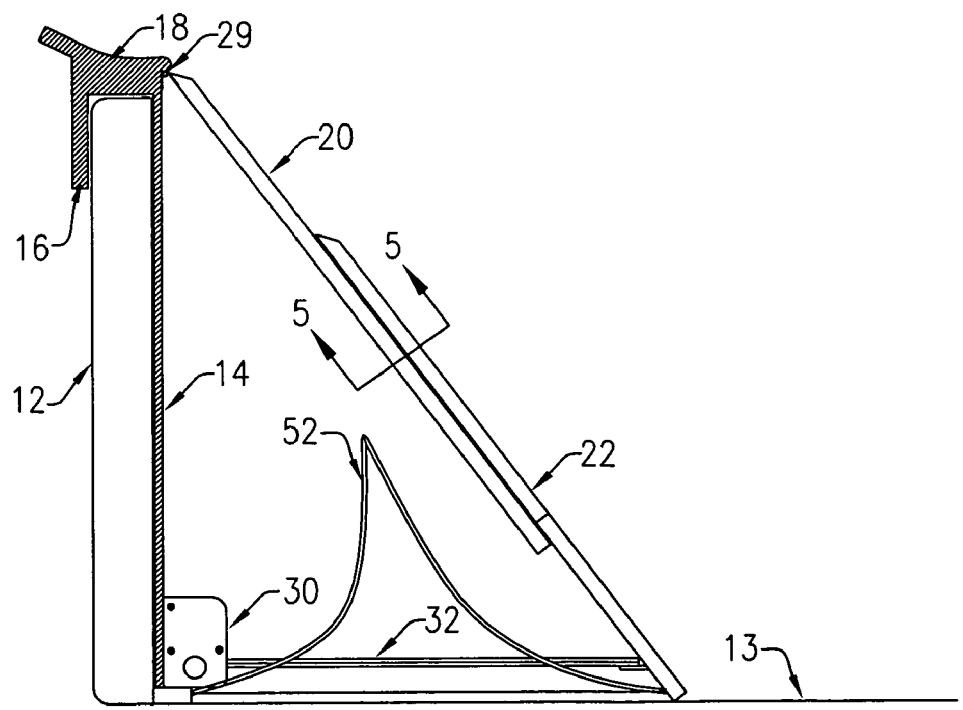
FIG. 2 is a side view of the embodiment of the deflector of FIG. 1 in a position intermediate the stowed and deployed position.
Figure 3:
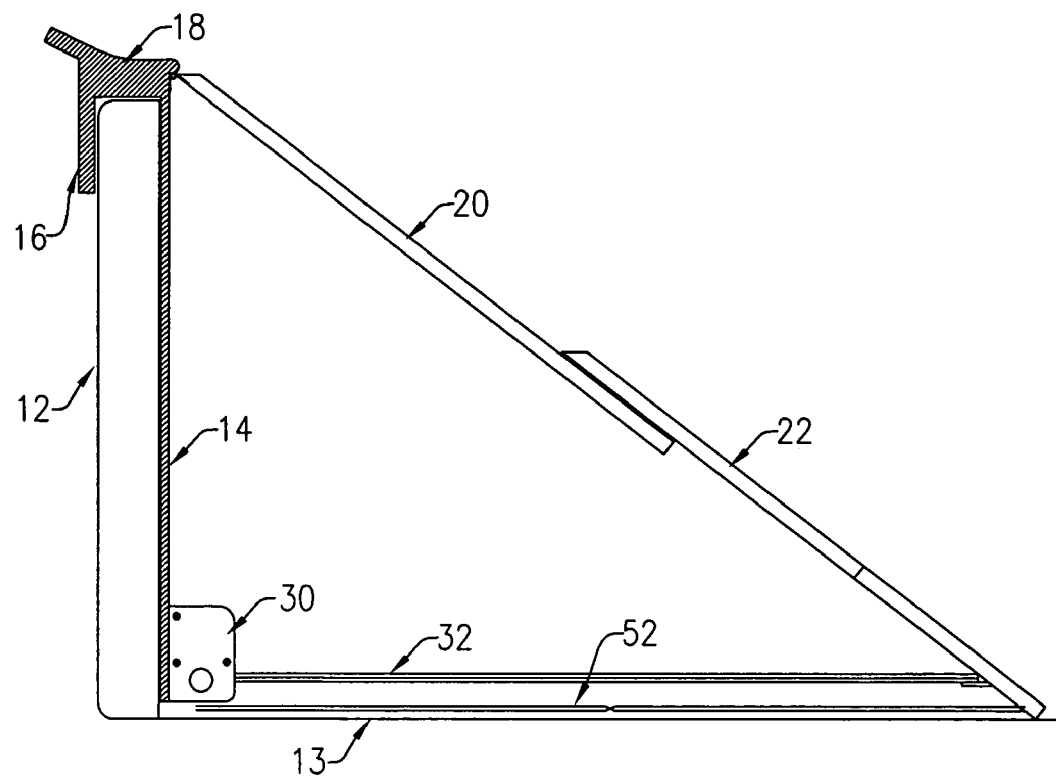
FIG. 3 is a side view of the embodiment of the deflector of FIG. 1 in the fully deployed position.

Referring to the Figures where like numerals represent like components, the tailgate 12 in FIGS. 1–3 is shown in the closed position above the bed 13 of the truck. The deflector may be retained on the tailgate 12 in any suitable conventional way, preferably by frictional engagement of the arms 14, 16 with the tailgate 12 across the entire width thereof, and may be made of any suitable material such as a molded high impact plastic. It has been found desirable to extend the inner arm 14 substantially to the truck bed to provide a place for the attachment of the deployment mechanism and gust straps as hereinafter described. This extension also provides the opportunity to insert a conventional fastener such as a self-tapping metal screw through the extension into the tailgate as a safety measure.

The deflector extends rearwardly from the tailgate 12 to form a spoiler 18 for the air exiting the truck bed, and it extends downwardly to form an elongated cavity or slot between the arms 14 and 16 that extends across the width of the tailgate 12.

Figure 4:
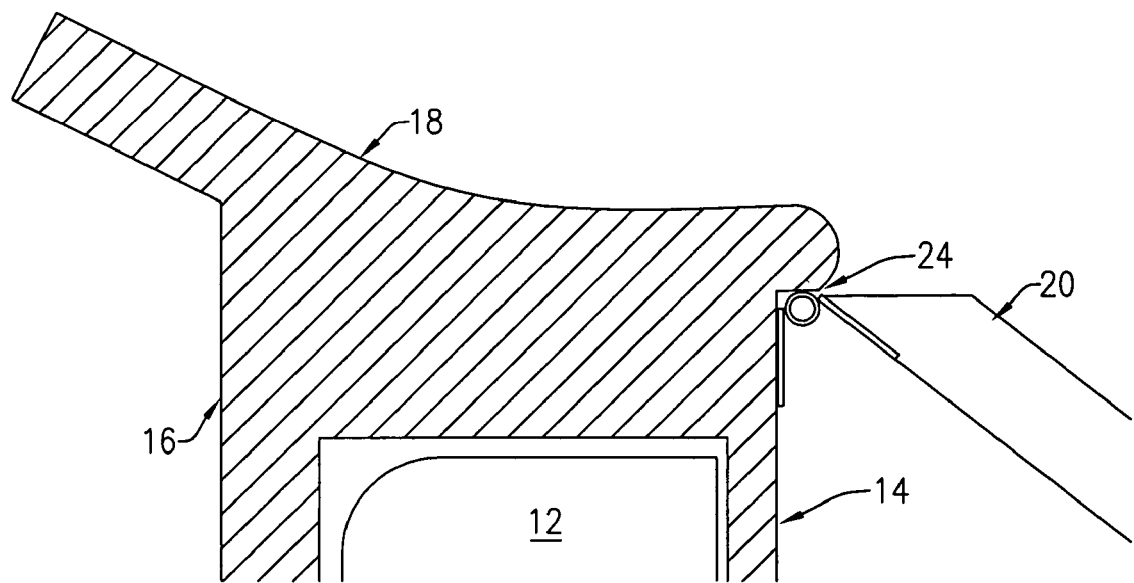
FIG. 4 is a side view of the upper end of the deflector of FIG. 1 illustrating the pivotal attachment of the upper, rear panel.

With continued reference to FIGS. 1–3, the deflector includes an upper, rear flat panel 20 and a lower, forward panel 22. The upper end of the upper panel is pivotally connected to the spoiler 18 by any suitable conventional hinge 24, one embodiment of which is illustrated in FIG. 4. As shown in FIG. 1, the upper panel 20 in the stowed position overlies the forward facing surface of the closed tailgate. The lower panel 22 is carried by the upper panel 20 so that it substantially overlies the upper panel 20 when in the stowed position shown in FIG. 1 and extends downwardly and forwardly into contact with the truck bed 13 when in the deployed position shown in FIG. 3. It is important that the lower panel 22 overlie rather than underlie the upper panel 20 to thereby reduce the drag of the wind flowing over the panels. It is also important that the upper end of the lower panel 22 overlie the lower end of the upper panel 20 when in the extended position to provide sufficient rigidity in the connection of the panels for them to act as a single surface when the deflector is fully deployed.

Figure 5:
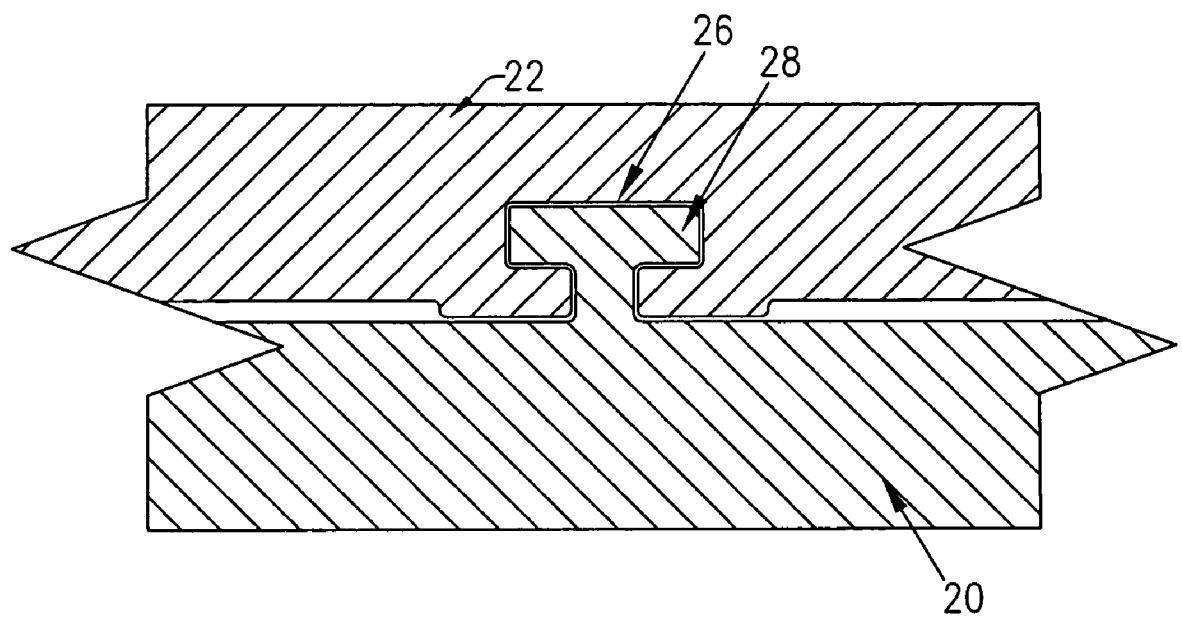
FIG. 5 is a partial section taken through lines 5—5 of FIG. 2 illustrating one embodiment of the slidable mounting of the two panels.

The sliding connection of the two panels 20, 22 may be any suitable conventional mechanical connection but is desirably a pair of spaced apart T-shaped slots 26 in the lower surface of the lower panel 22 into which are inserted T-shaped upward extensions 28 on the upper surface of the upper panel 20 as shown in FIG. 5. Any number of slots 26 and extensions 28 may be used, but it has been found sufficient to use two of these mating tracks located one each approximately one fourth of the width of the truck bed from the adjacent truck side wall.

Figure 6:
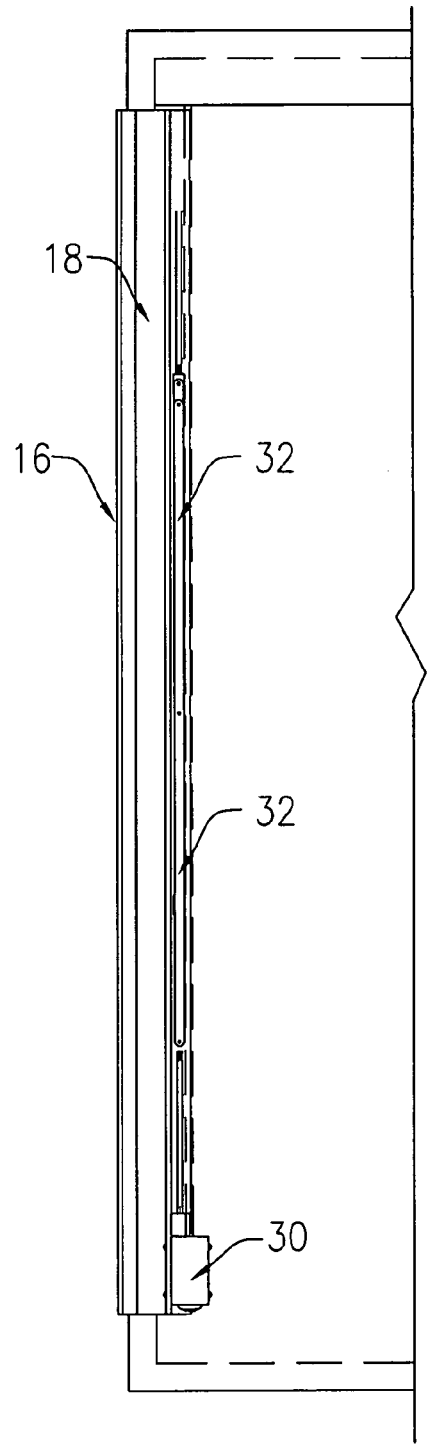
FIG. 6 is a top plan view of one embodiment of the deflector of the present invention in the stowed position.

As shown in FIGS. 1–3, the arm 14 at its lower end carries the mechanism 30 for deploying the deflector panels. The mechanism desirably takes the form of a scissors jack. As shown in FIGS. 1 and 6, the arms 32 of the jack lie flat between the forward surface of the closed tailgate 12 and the underside of the upper panel 20 when the deflector is in the closed position.

Figure 7:
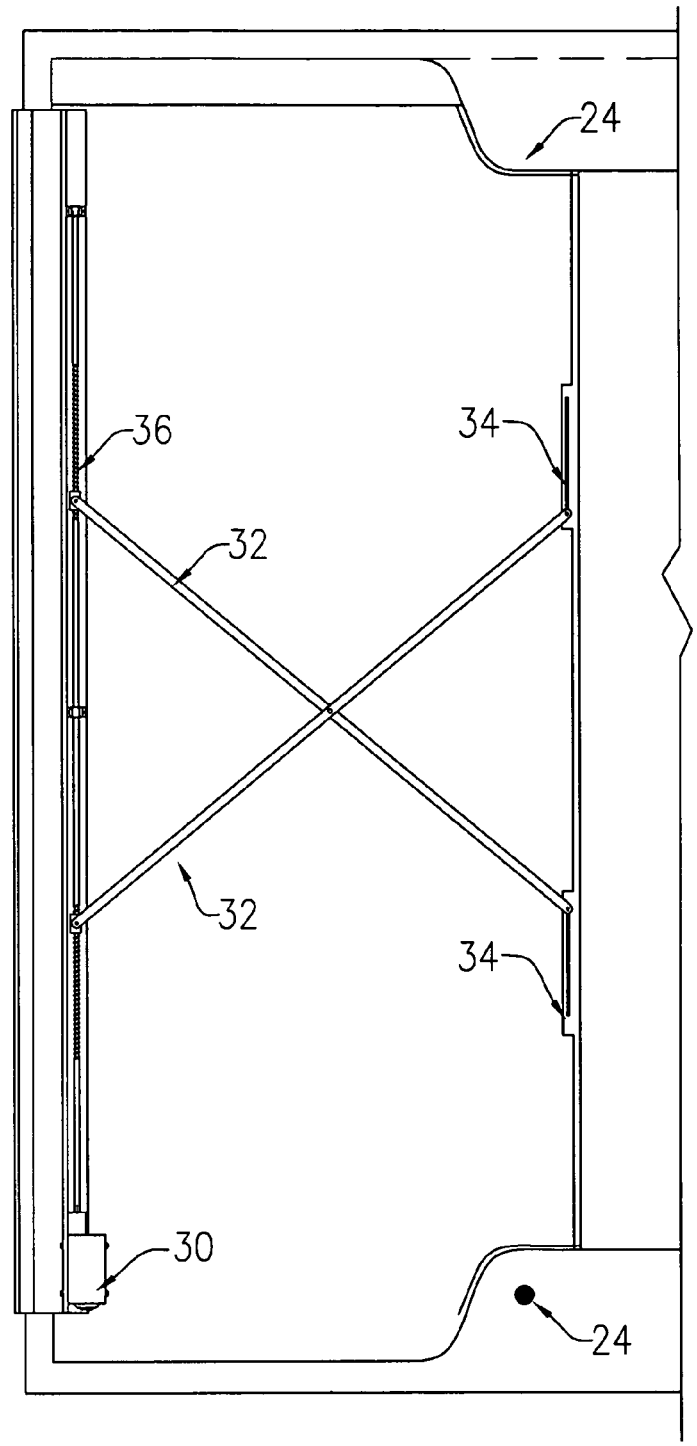
FIG. 7 is a top plan view of the embodiment of FIG. 6 in the deployed position.

As shown in FIGS. 3 and 7, the distal ends of the arms 32 extend forwardly when the deflector is deployed to thereby slide the lower panel 22 forwardly and downwardly along the upper panel 20. The distal ends of the arms 32 area adapted to mate with slots 34 provided on the lower surface of the lower panel 22 so that the point of contact on the arms 32 with the lower panel 22 may move transversely of the truck bed as the arms 32 are forwardly extended.

The actuating mechanism 30 may be any suitable conventional driving force for the arms 32 of the scissors jack, typically located only on one side of the jack with the other side mechanically constrained in a slot 36 but not driven.

Figure 8:
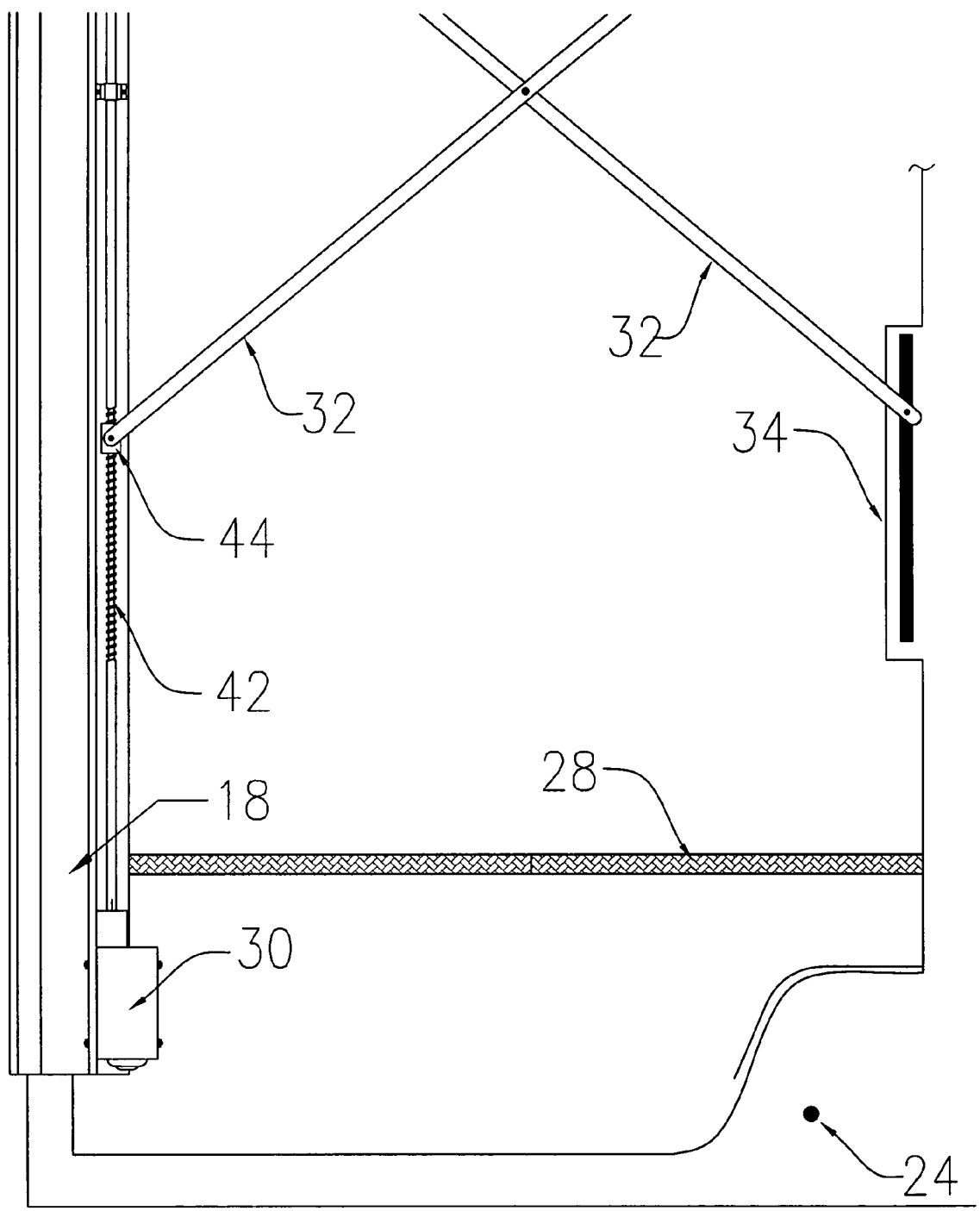
FIG. 8 is a partial top plan view of an embodiment of the present invention with an electric motor driven screw jack deploying mechanism.
Figure 9:
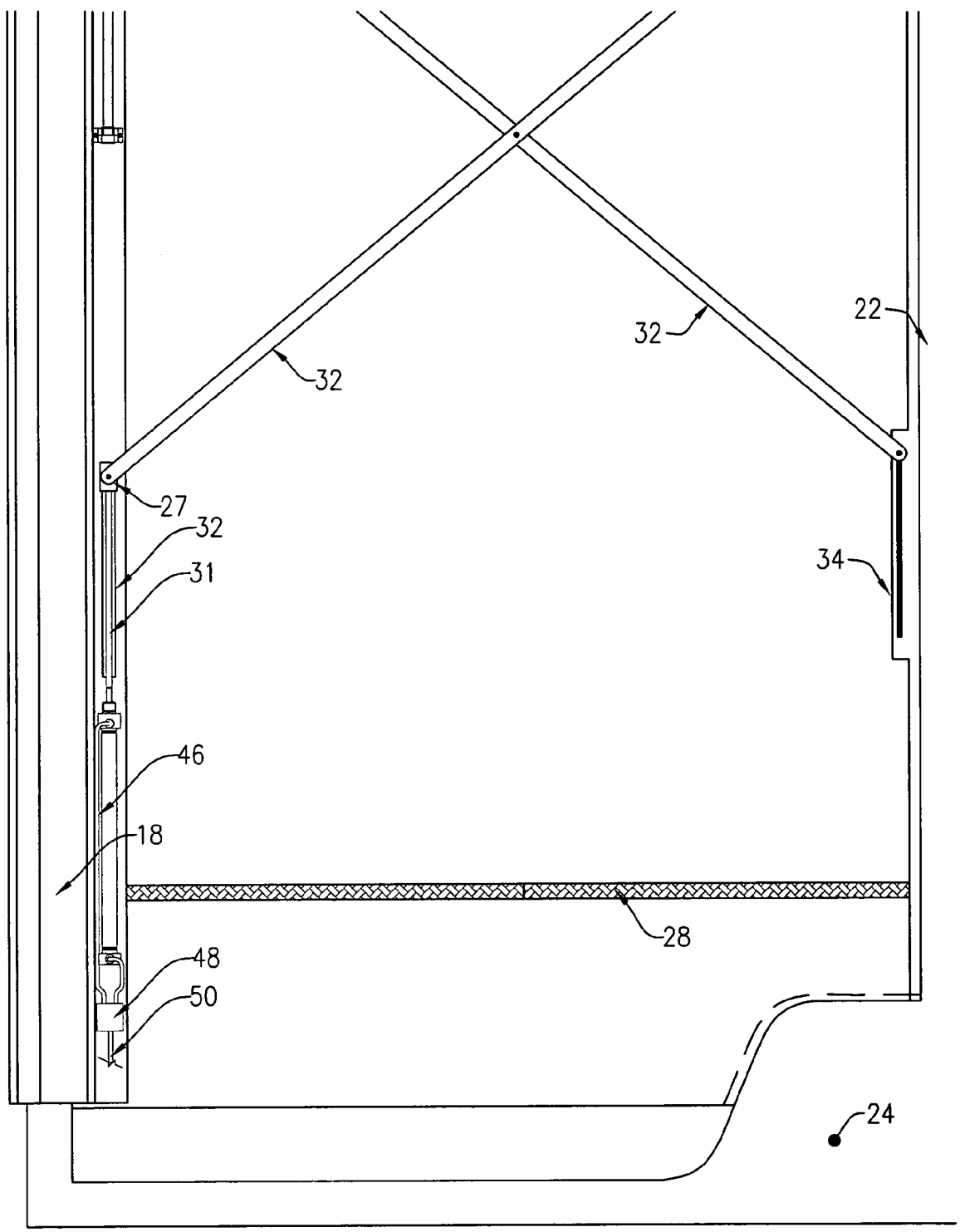
FIG. 9 is a partial top plan view of an embodiment of the present invention with a hydraulic deploying mechanism.

As shown in FIG. 8, the actuating mechanism may be an electric motor 40 rotatably driving a threaded shaft 42 to move a nut 44 laterally of the truck bed, thereby driving the arms 32 of the jack forwardly in a manner well known in the art. Alternatively, the actuating mechanism may be a hydraulic piston assembly 46 and pump 48 as shown in FIG. 9.

The actuating mechanism is desirably supplied with power from the truck battery through conventional wiring not shown in the interest of clarity. The control of the power may be exercised form any convenient location, but desirably by way of a switch 50 located on the actuating mechanism. The switch 50 may be manually operated by one leaning over the side wall of the truck, and/or remotely from the passenger compartment by control cables or any suitable conventional wireless technology.

As shown in FIGS. 1–3, the lower end of the lower panel 22 is connected to the lower end of the arm 14 by a gust strap 52 such as described in detail in applicant's U.S. Pat. No. 6,712,423, the disclosure of which is hereby incorporated herein by reference. The gust straps 52 are desirably made of a semi-rigid plastic material with a memory or crease lines so that the strap tends to fold and to lie flat between the two panels 20, 22 as the deflector is moved to the stored position. The gust straps tend to resist the lifting of the two panels as a unit as wind flows thereover and thus to maintain the lower end of the lower panel 22 in contact with the truck bed 13.

While preferred embodiments of the present invention have been described, it is to be understood that the embodiments described are illustrative only and that the scope of the invention is to be defined solely by the appended claims when accorded a full range of equivalence, many variations and modification naturally occurring to those of skill in the art from a perusal hereof.

What is claimed is:

1. In a selectively deployable, two rigid panel, wind deflector for a closed tailgate of the truck bed of a pickup truck which, when in a stored position, maintains both panels parallel to and adjacent the forward facing surface of the closed tailgate, and, when fully deployed, extends substantially across the width of the truck bed from the top of the closed tailgate downwardly and forwardly to a position adjacent the truck bed at a point rearward of the midpoint between the front and rear ends of the truck bed, to thereby reduce the aerodynamic drag of the closed tailgate as the pickup truck moves forwardly through the air, the improvement wherein the lower of the two panels of the deflector is slidingly mounted atop the upper of the two panels to reduce aerodynamic drag and the relative position of said two panels is controlled by a scissors jack operatively connected to the lower end of said lower panel.

2. The wind deflector of claim 1 wherein the extension of the two panels of the deflector relative to each other may be positively controlled throughout the deployment thereof.

3. The wind deflector of claim 1 wherein the extension of the two panels of the deflector relative to each other may be controlled by a person from a location external of the truck bed.

4. The wind deflector of claim 3 wherein said location is inside the passenger compartment of the truck.

5. The wind deflector of claim 1 wherein said scissors jack is electrically powered.

6. The wind deflector of claim 1 wherein said scissors jack is hydraulically powered.

7. The wind deflector of claim 1 wherein the lower end of the forward one of said two panels is maintained proximate to the truck bed throughout the deployment of the deflector.

8. The wind deflector of claim 7 wherein control of the forward end of said two panels is controlled by a gust strap.

* * * * *